(12) United States Patent
Iwasa et al.

(10) Patent No.: US 8,614,013 B2
(45) Date of Patent: Dec. 24, 2013

(54) ORGANIC SOLVENT DISPERSION, RESIN COMPOSITION, AND OPTICAL DEVICE

(75) Inventors: Hidefumi Iwasa, Yokohama (JP); Shigeo Kiso, Yokohama (JP); Terunobu Saitoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 90 days.

(21) Appl. No.: 13/256,876

(22) PCT Filed: Dec. 2, 2010

(86) PCT No.: PCT/JP2010/072060
§ 371 (c)(1),
(2), (4) Date: Sep. 15, 2011

(87) PCT Pub. No.: WO2011/099219
PCT Pub. Date: Aug. 18, 2011

(65) Prior Publication Data
US 2012/0003502 A1    Jan. 5, 2012

(30) Foreign Application Priority Data
Dec. 15, 2009   (JP) .................................. 2009-284553

(51) Int. Cl.
  B32B 19/00   (2006.01)
  C07F 9/09    (2006.01)
  C08K 5/41    (2006.01)

(52) U.S. Cl.
  USPC ........... 428/702; 524/127; 524/167; 524/171; 106/447

(58) Field of Classification Search
  None
  See application file for complete search history.

(56) References Cited

U.S. PATENT DOCUMENTS

| | | |
|---|---|---|
| 2005/0169861 A1 | 8/2005 | Lortz et al. |
| 2006/0070551 A1 | 4/2006 | Kanamori et al. |
| 2006/0090672 A1* | 5/2006 | Lu et al. .......... 106/447 |
| 2006/0128836 A1 | 6/2006 | Honda et al. |
| 2006/0188432 A1 | 8/2006 | Shio |
| 2008/0000703 A1 | 1/2008 | Shindou |
| 2008/0187732 A1 | 8/2008 | Shinohara et al. |

FOREIGN PATENT DOCUMENTS

| | | |
|---|---|---|
| CN | 1665890 A | 9/2005 |
| JP | 4-172362 A | 6/1992 |
| JP | 2000-070728 A | 3/2000 |
| JP | 2004-169018 A | 6/2004 |
| JP | 2008-006904 A | 1/2008 |
| JP | 2008-069046 A | 3/2008 |

OTHER PUBLICATIONS

Xiahong Zhang et al., "Stabilized Dispersions of Titania Nanoparticles Via a Sol-gel Process and Applications in UV-curable Hybrid Systems," 55(4) Polym. Int. 466-472 (2006) (XP 002627241).
Xiahong Zhang et al., "Stabiilzed Dispersion of Titania Nanoparticle in UV Curable Matrix Through Sol-Gel Process," No. 6 Acta Polymerica Sinica 750-755 (Sep. 2006).
Jianwen Yang et al., "Stabilized Dispersions of Titania Nanoparticles," Paper Collection of the 10th Asian Radiation Solidification International Conference, pp. 376-381 (May 2005).
Office Action in Chinese Application No. 201080056299.2 (dated May 14, 2013).
Communication pursuant to Article 94(3) EPC in European Application No. 10796164.1 (dated Sep. 25, 2013).
Office Action in Japanese Application No. 2009-284553 (dated Aug. 27, 2013).

* cited by examiner

*Primary Examiner* — Sheeba Ahmed
(74) *Attorney, Agent, or Firm* — Fitzpatrick, Cella, Harper & Scinto

(57) ABSTRACT

Provided are an organic solvent dispersion of titanium oxide containing at least titanium oxide fine particles each having an average primary particle diameter of 3 nm or more to 50 nm or less; a titanate-based surface treatment agent formed of a compound represented by the following general formula (1):

$$(R_1O)_m\text{---Ti---}X_n \qquad (1)$$

where $R_1$ represents a methyl, ethyl, or isopropyl group; X represents $\text{---O---SO}_2\text{---R}_2$ or $\text{---O---P(OH)O---O---PHO---O---R}_2$; $R_2$ represents an alkyl or aryl group having 1 to 16 carbon atoms; m represents a numerical value of 1 or more to 3 or less, and n represents a numerical value of 1 or more to 3 or less, provided that $m+n=4$; a polyether-based dispersant; and an alcohol-based solvent, and an optical material containing the organic solvent dispersion of titanium oxide and a resin.

10 Claims, 1 Drawing Sheet

ORGANIC SOLVENT DISPERSION, RESIN COMPOSITION, AND OPTICAL DEVICE

TECHNICAL FIELD

The present invention relates to an organic solvent dispersion with low scatter in which titanium oxide fine particles are dispersed, a resin composition, and an optical device using the same. More specifically, the present invention relates to an organic-inorganic composite resin useful as a material for optical applications, opto-device applications, display device applications, mechanical part applications, and electric/electronic part applications, and an optical device formed of the organic-inorganic composite resin.

BACKGROUND ART

An organic-inorganic composite resin is a composite resin in which inorganic fine particles at nanometer level are uniformly dispersed in a resin such as a monomer, oligomer, or polymer resin. Those composite resins are more excellent in various physical properties such as optical scattering property, heat resistance, and mechanical property compared with materials in each of which inorganic fine particles at micrometer level are dispersed in a resin.

Particularly in optical fields, optical materials each having a property which can not be achieved by a resin alone or an inorganic substance alone are developed by preparing an optical material using the organic-inorganic composite resin. Examples thereof include an investigation of an optical material in which fine particles of titanium oxide are dispersed in an energy-polymerizable acrylic monomer. Those optical materials each have properties such as a high refraction index, a low Abbe's number (νd), a high secondary dispersion property (θg, F), a high reflectance, a high heat resistance, and a high mechanical strength. From these points, the optical materials are expected to be utilized as useful optical members by molding into a membrane for a hard coating and a shape of a lens.

However, in general, the inorganic fine particles each having a single nanometer diameter size to a several tens nanometer size extremely easily form aggregates in an organic solvent or a monomer, oligomer, or polymer resin. As a result, the scatter occurs and clouding is produced. In particular, when the inorganic fine particles are used for an optical member such as a hard coating and lens, it is necessary to avoid the scatter due to the aggregation. Currently, sols in each of which the fine particles of titanium oxide are dispersed in a solvent are commercially available, but these sols are clouded and are inadequate to use as the optical material required to inhibit the scatter. Further, those sols also lack stability with time.

To uniformly disperse the inorganic fine particles each having the nanometer size in a resin, a method is effective in which first a sol in which the inorganic fine particles are uniformly dispersed in the solvent is prepared and then a resin is dissolved therein. It is also investigated to primarily disperse and stabilize inorganic fine particles by adding a dispersant or a surface treating agent in a solvent or a resin. In particular, when the occurrence of scatter is inhibited, it is necessary to uniformly disperse the inorganic fine particles or the aggregates thereof in a sufficiently smaller state than a wavelength of light.

In such circumstance, PTL 1 describes a composition for coating in which hydrolyzable silane, a titanium compound and/or an organosiloxane oligomer, and metal oxide fine particles are mixed. It is also described that a membrane obtained by applying the composition so that a thickness of the dried membrane be 0.2 μm is excellent in transparency. However, when the solvent is removed without making the composition obtained by the composition into a coated film, clouding occurs sometimes. Further, even when the composition is made into a coated film, clouding occurs when a membrane thickness is 100 μm or more.

Further, PTL 2 describes that a relatively transparent sol is obtained by dispersing titanium oxide in toluene using a saturated fatty acid or an unsaturated fatty acid as a dispersant, pulverizing the resulting sol of titanium oxide using a bead mill, and centrifuging the sol. However, the resultant sol is a slightly clouded liquid with scatter probably because the aggregates can not be removed well.

A solution in which ZEONEX (manufactured by Zeon Corporation) as an organic polymer is dissolved in toluene, which is then mixed with the sol is prepared. A polymer-based nanocomposite is made by removing the toluene solvent from the solution, and it is described that the nanocomposite is also a slightly clouded material with scatter.

So, no organic solvent dispersion and no organic-inorganic composite resin composition in which titanium oxide fine particles are dispersed in a state with extremely low scatter in the solvent without impairing the properties of titanium oxide are substantially obtained.

CITATION LIST

Patent Literature

PTL 1: U.S. Patent Application No. 2006/0070551
PTL 2: Japanese Patent Application Laid-Open No. 2008-6904

SUMMARY OF INVENTION

Technical Problem

The present invention have been made in the light of such background art, and it is an object of the present invention to provide an organic solvent dispersion with low scatter in which titanium oxide fine particles are dispersed in a solvent, a resin composition, and an optical device with low scatter, in which titanium oxide fine particles are dispersed in an organic resin.

An organic solvent dispersion including titanium oxide fine particles dispersed therein, which solves the above-mentioned problem, includes:
at least titanium oxide fine particles each having an average primary particle diameter of 3 nm or more to 50 nm or less;
a titanate-based surface treatment agent formed of a compound represented by the following general formula (1):

$$(R_1O)_m\text{—Ti—}X_n \qquad (1)$$

where $R_1$ represents a methyl, ethyl, or isopropyl group; X represents —O—SO$_2$—R$_2$ or —O—P(OH)O—O—PHO—O—R$_2$; R$_2$ represents an alkyl or aryl group having 1 to 16 carbon atoms; m represents a numerical value of 1 or more to 3 or less, n represents a numerical value of 1 or more to 3 or less, provided that m+n=4; a polyether-based dispersant; and an alcohol-based solvent.

Further features of the present invention will become apparent from the following description of exemplary embodiments with reference to the attached drawings.

DESCRIPTION OF EMBODIMENTS

Figure 1A:
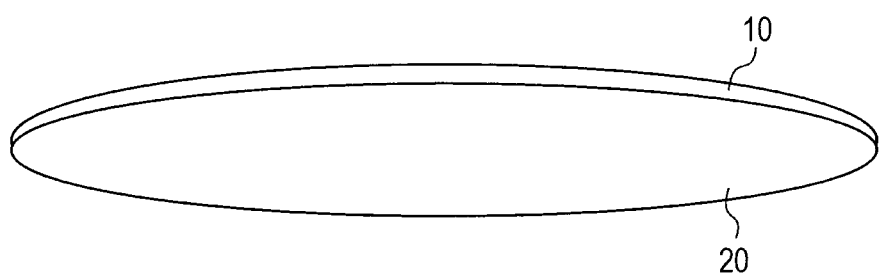
FIGS. 1A and 1B are schematic views of an optical device in the present invention.

Hereinafter, the present invention is described in detail. An organic solvent dispersion including titanium oxide fine particles dispersed therein, according to the present invention, includes: at least titanium oxide fine particles each having an average primary particle diameter of 3 nm or more to 50 nm or less; a titanate-based surface treatment agent formed of a compound represented by the following general formula (1):

$$(R_1O)_m\text{—Ti—}X_n \qquad (1)$$

Where $R_1$ represents a methyl, ethyl, or isopropyl group; X represents —O—$SO_2$—$R_2$ or —O—P(OH)O—O—PHO—O—$R_2$; $R_2$ represents an alkyl or aryl group having 1 to 16 carbon atoms; m represents a numerical value of 1 or more to 3 or less, and n represents a numerical value of 1 or more to 3 or less, provided that m+n=4; a polyether-based dispersant; and an alcohol-based solvent.

Next, each ingredient contained in the organic solvent dispersion of the present invention, in which titanium oxide fine particles are dispersed is described.

(Titanium Oxide Fine Particle)

The organic solvent dispersion of the present invention is characterized by containing at least the titanium oxide fine particles each having an average primary particle diameter of 3 nm or more to 50 nm or less. In particular, when the occurrence of scatter is inhibited, it is necessary to uniformly disperse the titanium oxide fine particles in the solvent. Further, even when the titanium oxide fine particles form aggregates, there is no problem as long as the particle diameter of the aggregate is sufficiently smaller than a wavelength of light and the aggregates are uniformly dispersed in the solvent.

Examples of the titanium oxide fine particles used in the present invention include titanium oxide or complexes of titanium oxide with compounds other than titanium oxide. Examples of the compounds other than titanium oxide include titanates such as barium titanate, strontium titanate, potassium titanate, and calcium titanate, the titanium oxide doped with nitrogen, and titanates. Further, examples include complexes of oxides such as cerium oxide, zirconium oxide, aluminum oxide, strontium oxide, zinc oxide, tin oxide, antimony oxide, selenium oxide, indium tin oxide, and yttrium oxide, sulfides such as CdS, CdSe, ZnSe, CdTe, ZnS, HgS, HgSe, PdS, and SbSe, and nitrides such as GaN. These can be used alone or in mixture of two or more kinds. A fine particle like coating one type of a substance with another substance to make a core-shell type fine particle can also be used.

As a particle diameter of the titanium oxide fine particle used for the present invention, it is preferred that the average primary particle diameter be 3 nm or more to 50 nm or less. By uniformly dispersing the fine particles each having a particle diameter which is sufficiently smaller than the wavelength of light, it is possible to obtain an organic-inorganic composite resin with low scatter. It is desirable that the average primary particle diameter be preferably 30 nm or less and more preferably 20 nm or less. When the average primary particle diameter is less than 3 nm, the properties of the fine particle become lower than those of bulks such as crystal due to changes of the properties by reduction of crystallinity and a quantum size effect. Thus, when it is desired that the property depending on titanium oxide, such as high refraction index be reflected to the final organic-inorganic composite resin, depending on the type of the fine particle, it is preferred to use the fine particle having the average primary particle diameter of 3 nm or more. Further, if the average primary particle diameter is more than 50 nm, when the particles are aggregated, scatter is caused.

In addition, the titanium oxide fine particle used in the present invention can be produced by wet methods such as a sol gel method, dry methods such as a CVD method, and plasma methods such as a direct current plasma arc method, a plasma jet method, and a high frequency plasma method. Wet methods such as a sol gel method and a direct current plasma arc method are preferred in terms of productivity.

The content of the titanium oxide fine particles contained in the organic solvent dispersion of the present invention is 0.1% by weight or more to 30.0% by weight or less, preferably 1.0% by weight or more to 20.0% by weight or less with respect to the entire organic solvent dispersion. When the content is higher than 30.0% by weight, the stability with time is deteriorated, and clouding or gelation which causes scatter to easily occur. When the content is less than 0.1% by weight, mass production efficiency is reduced when a sol containing titanium oxide at high concentration is wanted. A process of removing the solvent is prolonged when it is necessary that finally the organic solvent dispersion is mixed with a resin and the solvent is removed.

It should be noted that content (% by weight) of the titanium oxide fine particles contained in the organic solvent dispersion is represented by (weight of titanium oxide fine particles)×100/(weight of organic solvent dispersion).

(Titanate-Based Surface Treatment Agent)

A titanate-based surface treatment agent formed of a compound represented by the following general formula (1):

$$(R_1O)_m\text{—Ti—}X_n \qquad (1)$$

is used as the surface treatment agent in the present invention.

In the general formula (1), $R_1$ represents a methyl, ethyl, or isopropyl group; X represents sulfonic acids represented by —O—$SO_2$—$R_2$ or phosphonic acids represented by —O—P(OH)O—O—PHO—O—$R_2$; and $R_2$ represents an alkyl or aryl group having 1 to 16 carbon atoms. Examples of the aryl group include a phenyl, tolyl, and naphthyl group.

m represents a numerical value of 1 or more to 3 or less, and n represents a numerical value of 1 or more to 3 or less, provided that m+n=4.

Specific examples of the titanate-based surface treatment agent include isopropyl trimethylsulfonyl titanate, isopropyl tris(trifluoromethylsulfonyl)titanate, isopropyl tridodecylsulfonyl titanate, isopropyl triphenylsulfonyl titanate, isopropyl tri-p-toluene sulfonyl titanate, isopropyl tridodecylbenzenesulfonyl titanate, diisopropyl bis(dodecylbenzenesulfonyl) titanate, triisopropyl dodecylbenzenesulfonyl titanate, isopropyl tris(dioctylpyrophosphate)titanate, diisopropyl bis(dioctylpyrophosphate)titanate, and triisopropyl(dioctylpyrophosphate)titanate. One kind or two or more kinds of those may be used in combination. Of those, preferred are isopropyl tridodecylbenzenesulfonyl titanate and isopropyl tris(dioctylpyrophosphate)titanate.

In the surface treatment agent of the present invention, a larger acid dissociation constant is more desirable for stabilizing the dispersion of the titanium oxide fine particles. That is, phosphonic acids are more preferred than carboxylic acids, and sulfonic acids are still more preferred. In general, in order to disperse fine particles without aggregation, a larger absolute value of a zeta potential of the fine particle is more advantageous. Here, the zeta potential refers to an electric potential in an outer layer interface in an electric double layer formed on the surface of a fine particle dispersed in a solvent. In the zeta potential, a point at which the electric potential is zero, i.e., an isoelectric point is present depending on pH of the solvent. The aggregation easily occurs around the isoelectric point because an electrostatic repulsive force between the fine particles does not occur. Thus, when the absolute value of the zeta potential is increased by shifting pH from the isoelectric point, the fine particles become hard to be agglutinated.

The isoelectric point of the titanium oxide fine particle in the present invention is generally present around pH 6 to 7 depending on the particle diameter and the solvent, and thus, it is effective in terms of the zeta potential to shift pH to a more acidic side. Although it is also possible to use a basic surface treatment agent, no effective compound in terms of coloration is known. Therefore, the titanate-based surface treatment agent in which X in the general formula (1) represents sulfonic acids represented by —O—$SO_2$—$R_2$ or phosphonic acids represented by —O—P(OH)O—O—PHO—O—$R_2$ is effective as the surface treatment agent of the present invention.

The content of the titanate-based surface treatment agent contained in the organic solvent dispersion of the present invention is 10.0% by weight or more to 75.0% by weight or less, preferably 15.0% by weight or more to 65.0% by weight or less with respect to the weight of the titanium oxide fine particles. The content of the surface treatment agent varies depending on the type of a solvent, the type of a dispersant, and the average particle diameter of the titanium oxide fine particles, and the surface treatment agent can be used in an amount of most preferably 20.0% by weight or more to 45.0% by weight or less. When the content of the surface treatment agent is more than 75.0% by weight, the properties attributed to the fine particles are reduced as is the case with the dispersant described below. Further, when the content is less than 10.0% by weight, gelation or clouding easily occurs.

It should be noted that the content (% by weight) of the titanate-based surface treatment agent contained in the organic solvent dispersion is represented by (weight of titanate-based surface treatment agent)×100/(weight of titanium oxide fine particles).

Further, when optimal contents of the dispersant and the surface treatment agent are not used, gelation occurs during the dispersion treatment or when a resin is added and the solvent is removed.

(Polyether-Based Dispersant)

It is necessary that the surface treatment agent according to the present invention is combined with a polyether-based dispersant.

That is, when the polyether-based dispersant having these polar groups is used, the electric double layer is formed on the surface of the titanium oxide fine particles in an alcohol-based solvent, and thus a repulsive potential due to overlap of the electric double layer formed on the surface of the fine particle occurs when the fine particles abut each other. In particular, when the absolute value of the zeta potential is increased by acidification as described above, the aggregation of the fine particles can be inhibited more effectively because a potential barrier due to the electrostatic repulsive force which works between the particles is also increased. Meanwhile, when the dispersant having no polarity is used, the electric double layer is not formed effectively on the surface of the fine particle. Thus, the potential barrier due to the electrostatic repulsive force is reduced, and the effect of the zeta potential increased by the acidification is not sufficient.

Specific examples of the polyether-based dispersant of the present invention include polyethylene glycol, polypropylene glycol, poly-2-propylene glycol, EMALEX 100-type, EMALEX 500-type, EMALEX 600-type, EMALEX 700-type, EMALEX DAPE-type, EMALEX BHA-type, EMALEX CS-type, EMALEX 1600-type, EMALEX 1800-type, EMALEX OD-type, EMALEX 2400-type, EMALEX PEL-12-type, EMALEX 800-type, EMALEX PEIS-EX-type, EMALEX OE-type, EMALEX LWS-type, EMALEX LWIS-type, EMALEX CWS-type, EMALEX SWS-type, EMALEX PEG-di-L-type, EMALEX PEG-di-S-type, EMALEX PEG-di-IS-type, EMALEX PEG-di-O-type (all of which are manufactured by Nihon-Emulsion Co., Ltd.). One kind or two or more kinds of those may be used in combination. Further, DISPER BYK-103, DISPER BYK-106, DISPER BYK-110, DISPER BYK-111, DISPER BYK-112, DISPER BYK-180 (all of which are manufactured by BYK-Chemie Japan), or Solsperse 41090 (manufactured by The Lubrizol Corporation) may also be used in combination.

Of those, preferred examples are polypropylene glycol and poly-2-propylene glycol.

The content of the polyether-based dispersant contained in the organic solvent dispersion of the present invention is 3.0% by weight or more to 60.0% by weight or less, preferably 5.0% by weight or more to 55.0% by weight or less, more preferably 10.0% by weight or more to 30% by weight or less with respect to the weight of the titanium oxide fine particles. When the content of the dispersant in the dispersion is more than 60.0% by weight, the properties attributed to the fine particles are reduced by being affected with the properties of the dispersant in the dispersion or in the organic-inorganic composite resin composition after the resin was combined and the solvent was removed. When the content of the dispersant in the dispersion is less than 3.0% by weight, gelation or clouding easily occurs.

It should be noted that the content (% by weight) of the polyether-based dispersant contained in the organic solvent dispersion is represented by (weight of polyether-based dispersant)×100/(weight of titanium oxide fine particles).

(Alcohol-Based Solvent)

Examples of the alcohol-based solvent used for the present invention include methanol, ethanol, 11-propanol, 2-propanol, butanol, pentanol, and hexanol. Of those, preferred ones include ethanol, 2-propanol, and butanol, and upon actual use, it is preferred to use the alcohol-based solvent in conjunction with compatibility with the aforementioned surface treatment agent and dispersant and dispersibility of the fine particles. When the solvent having an excessively high boiling point is used, it becomes necessary to heat to a higher temperature and reduce a pressure when the solvent is finally removed, and a dispersed state of the fine particles is broken down in some cases. The alcohol-based solvent can be used alone or in mixture of two or more kinds.

If necessary, it is also possible to add the organic solvent such as acetone, ethyl acetate, tetrahydrofuran, methyl ethyl ketone, isobutyl methyl ketone, toluene, xylene, N,N-dimethylformamide, dimethylsulfoxide, and N-methyl-2-pyrrolidone to an extent that the dispersed state of the fine particles is not impaired. This allows a resin and an additive which have a low solubility in an alcohol-based solvent to be also added to the solvent.

It is preferred that the alcohol-based solvent and the solvent which is able to be added if necessary be solvents with higher purity which do not contain water and are dehydrated. This is because if water is contained in a large amount, the effects of the surface treatment agent and the dispersant are reduced.

The content of the alcohol-based solvent contained in the organic solvent dispersion of the present invention is 180% by weight or more to 100,000% by weight or less, preferably 350% by weight or more to 10,000% by weight or less with respect to the weight of the titanium oxide fine particles. When the content is more than 100,000% by weight, the concentration of the fine particles in the sol is diluted, it takes a long time to disperse the fine particles, and a production efficiency of the sol is not good. It also takes a long time to remove the solvent. When the content is less than 180% by weight, the concentration of the fine particles is increased, it becomes highly likely that the fine particles are agglutinated again, and it takes a long time to disperse the fine particles. As a result, clouding or gelation occurs.

The content (% by weight) of the alcohol-based solvent contained in the organic solvent dispersion of the present invention is represented by (weight of alcohol-based solvent)×100/(weight of titanium oxide fine particles).

As other ingredients other than the aforementioned ingredients, an antioxidant, a reducing agent, an ultraviolet ray absorber, and a mold releasing agent can also be contained in the organic solvent dispersion of the present invention.

(Method of Producing Organic Solvent Dispersion)

Next, a method of producing the organic solvent dispersion of the present invention in which titanium oxide fine particles are dispersed is described.

The method of producing the organic solvent dispersion of the present invention has a step of performing a bead mill dispersion treatment using beads as media in the method of producing the organic solvent dispersion by the dispersion treatment of a mixed solution containing at least the titanium oxide fine particles each having the average primary particle diameter of 3 nm or more to 50 nm or less, the titanate-based surface treatment agent formed of the compound represented by the general formula (1), the polyether-based dispersant, and the alcohol-based solvent.

To be specific, the organic solvent dispersion in which titanium oxide fine particles are dispersed is obtained by sequentially adding the polyether-based dispersant, the titanium oxide fine particles, and the titanate-based surface treatment agent to at least the alcohol-based solvent shown above, and dispersing them by various methods. The dispersion can be prepared using a dispersing machine such as an ultrasound mill, a sand mill, a jet mill, a disc mill, or a bead mill. This can give the organic solvent dispersion in which the titanium oxide fine particles are preliminarily dispersed in the alcohol-based solvent to the extent that the titanium oxide fine particles are not precipitated. In this state, there are still many aggregates of the fine particles, and the sol is clouded and scatters. It should be noted that the selection of the dispersing machine is not particularly limited, and there may be used the dispersing machine having an ability to preliminarily disperse titanium oxide fine particles to the extent that the fine particles are not precipitated.

Next, the organic solvent dispersion in which scatter is extremely low can be produced by treating the obtained clouded organic solvent dispersion in which titanium oxide fine particles are dispersed using a bead mill dispersion treatment apparatus. It is preferred in terms of hardness to use media made from zirconia as media used for the bead mill treatment. Media having the average primary particle diameter of 10 to 50 μm can be used.

A mechanism of the bead mill dispersion treatment is to enhance the dispersibility of the fine particles by repeatedly hitting the beads as media to the desired aggregates of the fine particles in the solution to gradually loosen the aggregates. As the particle diameter of media is smaller, the hitting to the aggregate is milder, and once loosened aggregate becomes hard to be agglutinated again. However, when the particle diameter of media is excessively small, it takes a long time to loosen the aggregate, and the treatment is not efficient. Thus, when the inorganic fine particles each having a single nanometer size to a several tens nanometer size used for the present invention are subjected to the dispersion treatment, media having the size of 15 to 30 μm can be preferably used. In addition, the dispersibility can be further enhanced by circulating the once treated solution and repeating the dispersion treatment.

In the present invention, in particular, the types of the dispersant and the surface treatment agent must be most carefully selected in the light of all steps of producing the sol, subjecting the sol to the dispersion treatment in the bead mill dispersion apparatus, and producing a resin composition. When only any one of the dispersant or the surface treatment agent described above is combined, gelation often occurs during the process of removing the solvent in a state in which a resin is added to the sol. Further, even when both are combined, even if no gelation occurs immediately after removing the solvent, the stability with time is deteriorated, and finally gelation or re-aggregation also often occurs due to compatibility between the dispersant and the surface treatment agent. That is, in order to uniformly disperse the titanium oxide fine particles in the alcohol-based solvent to obtain the stable sol with extremely low scatter in the present invention, the aforementioned two agents, that is, the dispersant and the surface treatment agent are essential ingredients.

(Resin Composition)

Next, the resin composition of the present invention is described.

The resin composition of the present invention is characterized in that the resin composition is made by the organic solvent dispersion in which titanium oxide fine particles are dispersed, an organic resin, and the like. The sol with extremely low scatter, which can be used as a coating agent for a hard coating, can be obtained by adding a resin soluble in the solution used in the organic solvent dispersion obtained above and an energy polymerization initiator to the organic solvent dispersion and uniformly dissolving them. An uncured resin composition is made by removing an alcohol-based solvent from the sol. A cured resin composition is obtained by energy-polymerizing the uncured resin composition. Further, a resin composition can also be made by a thermoplastic organic resin in place of the energy-polymerizable organic resin.

It should be noted that the sol stated herein refers to a sol containing a solvent such as alcohol, and the organic solvent dispersion is a sol. The resin composition explained herein is a composition that is cured after the solvent is removed from the sol. The composition before cured is referred to as an uncured resin composition.

It is necessary to select the organic resin so that the dispersibility of the fine particles be not impaired in consideration of affinity and compatibility with the fine particles, the dispersant, the surface treatment agent, and the solvent. In particular, when it is desired to perform cure reaction by polymerization with imparted energy, an organic resin having at least a polymerizable unsaturated functional group is preferred.

Examples of the organic resin include photopolymerizable or thermally polymerizable monomer, oligomer, or polymer of acrylic-based, methacrylic-based, vinyl-based, or epoxy-based resins. Specific examples of commercially available resins include KAYARADO R-604, KAYARADO R-684 (each manufactured by Nippon Kayaku Co., Ltd.), SR9003 (manufactured by Sartomer Company Inc.), EA-5520, EA-5521, EA-5821, EA-5921, EA-1026, EA-1028, A-DCP, DCP, A-DOD, DOD, A-PTMG65, A-TMPT-3EO, A-GLY, A-9300-1CL, BPE-80N, BPE-100, and BPE-200 (each manufactured by Shin-Nakamura Chemical Co., Ltd.), LIGHT ACRYLATE TMP-A (manufactured by Kyoei Chemical Co., Ltd.), BPEF-A (manufactured by Osaka Gas Chemicals Co., Ltd.), and UV1000-I5RE (manufactured by Mitsubishi Chemical Corporation). Further, there may be used polymers of the oligomers and polymers, and one kind or two or more kinds of those may be used in combination.

As the energy polymerization initiator, a photopolymerization initiator or a thermal polymerization initiator can be used.

In the present invention, a photopolymerization initiator used when a photopolymerizable resin is used is one utilizing a radical polymerization initiator to utilize a radical generation mechanism by light energy irradiation, and is typically preferred for film formation of a hard coating and molding of lens. Specific examples of the photopolymerization initiator include 2-benzyl-2-dimethylamino-1-(4-morpholinophenyl)-1-butanone, 1-hydroxy-cyclohexyl-phenylketone, 2-hydroxy-2-methyl-1-phenyl-propane-1-one, bis(2,4,6-trimethylbenzoyl)-phenylphosphineoxide, 4-phenylbenzophenone, 4-phenoxybenzophenone, 4,4'-diphenylbenzophenone, and 4,4'-diphenoxybenzophenone.

A ratio of the photopolymerization initiator to be added to an organic polymerizable resin ingredient can be appropriately selected depending on a light irradiation amount and further an additional heating temperature, and can also be adjusted depending on an objective average molecular weight of a polymer to be obtained. The amount of the photopolymerization initiator to be added in the resin composition of the present invention is preferably in the range of 0.01% by weight or more to 10.00% by weight or less with respect to the organic polymerizable resin. The photopolymerization initiator can be used alone or in mixture of two or more kinds depending on a reactivity of the organic resin and the wavelength of light used for the irradiation.

Further, as the photopolymerization initiator when the organic photopolymerizable resin is used in the present invention, a cation polymerization initiator other than the radical polymerization initiator can be utilized to utilize a cation generation mechanism by light irradiation, which is preferred for the film formation and the molding in the case of polymerizing under the condition of oxygen inhibition. Representative examples of the photopolymerization initiator include Irgacure 250, which exhibits an excellent curing property and can realize low yellowing by sufficient ultraviolet ray irradiation. Irgacure 250 is specifically exemplified as the cation polymerization initiator, but examples of the cation polymerization initiator is not limited thereto.

Further, as the thermal polymerization initiator when the thermally organic polymerizable resin is used in the present invention, the radical polymerization initiator can be utilized to utilize the radical generation mechanism by heating, which is also preferred for the film formation of a hard coating and the molding of a lens. Examples of the thermal polymerization initiator include azobisisobutyronitrile (AIBN), benzoyl peroxide, t-butylperoxy pivalate, t-butylperoxyneohexanoate, t-hexylperoxyneohexanoate, t-butylperoxyneodecanoate, t-hexylperoxyneodecanoate, cumylperoxyneohexanoate, and cumylperoxyneodecanoate. It should be noted that the ratio of the thermal polymerization initiator to be added to the polymerizable resin ingredient can be appropriately selected depending on the heating temperature and further an oxygen amount present upon molding, and can also be adjusted depending on an objective polymerization degree of a molded body to be obtained. The amount of the thermal polymerization initiator to be added in the organic resin composition of the present invention is preferably in the range of 0.01% by weight or more to 10.00% by weight or less with respect to the polymerizable resin. The thermal polymerization initiator can be used alone or in mixture of two or more kinds depending on the reactivity of the organic resin and the desired heating temperature.

The radical polymerization initiator or the cation polymerization initiator can be used alone, or both thereof can be used in combination. The photopolymerization initiator and the thermal polymerization initiator can also be used in combination. A thermoplastic resin may also be mixed and combined as the organic resin. To be specific, polymethyl methacrylate and polycarbonate are exemplified.

(Optical Device)

Next, the optical device of the present invention is described.

The optical device of the present invention can be obtained by curing the uncured resin composition in which the alcohol-based solvent is removed from the sol that is compatibilized with the aforementioned energy-polymerizable organic resin or the like. In addition, the optical device can be obtained by melting again the resin composition in which the alcohol-based solvent is removed from the sol that is compatibilized with the aforementioned thermoplastic organic resin and by molding it.

When the optical device is produced, the content of the titanium oxide fine particles contained in the optical device is 0.1% by weight or more to 65.0% by weight or less, preferably 1.0% by weight or more to 45.0% by weight or less with respect to the weight of a resin. When the content is more than 65.0% by weight, gelation or clouding easily occurs. When the content is less than 0.1% by weight, the optical device is influenced by the properties of ingredients other than the fine particles, and the properties attributed to the fine particles are reduced. It should be noted that the content (% by weight) of the titanium oxide fine particles contained in the optical material is represented by (weight of titanium oxide fine particles)×100/(weight of resin).

Next, a step of forming the optical device from the aforementioned uncured resin composition by utilizing the photopolymerization mechanism is set forth.

When a layer structure of the resin composition 1 is formed on a glass lens substrate or plastic lens substrate which serves as a substrate on which the optical device is molded, a die is molded, for example, by pouring the uncured resin composition between the lens and a corresponding die and lightly holding it down. The resin composition is photopolymerized with keeping such state. The light irradiation subjected to such photopolymerization reaction is performed utilizing light with a suitable wavelength, typically ultraviolet light or visible light in a corresponding way to the mechanism attributed to the radical generation utilizing the photopolymerization initiator. To be specific, the molded optical material is uniformly irradiated with the light through the lens. The amount of the irradiated light is appropriately selected depending on the mechanism attributed to the radical generation utilizing the photopolymerization initiator or a ratio of the contained photopolymerization initiator. Next, the optical device of the optical member formed of the glass lens substrate on one side and the resin composition on the other side is obtained by releasing the resin composition integrated with the lens substrate from the mold.

FIG. 1A shows a schematic view of an optical device produced in such way. In the figure, the optical device is formed of an optical member 10 formed of the organic resin in which the titanium oxide fine particles are dispersed and the glass lens substrate 20.

In addition, if necessary, an optical device sandwiched with lenses can be obtained by using the resin composition integrated with the lens substrate and another lens substrate. For example, the same uncured resin composition is poured between the surface of the resin composition side of the aforementioned optical device and another corresponding lens, and molding is performed by lightly holding it down. The uncured resin composition is photopolymerized with keeping such state, thereby being able to obtain the optical device in which the resin composition is sandwiched with glass lenses.

Figure 1B:
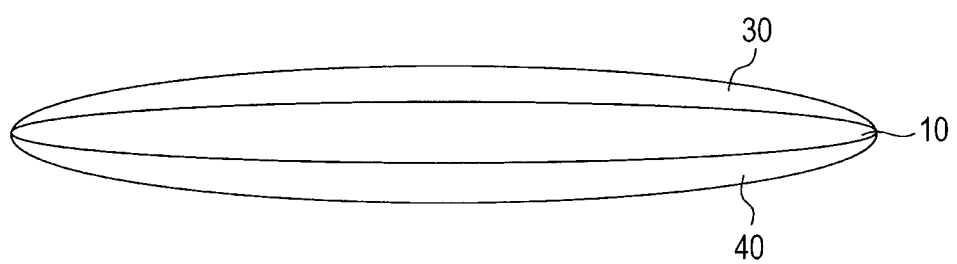

FIG. 1B shows a schematic view of an optical device produced in such way. In the figure, the optical device is formed of an optical member 10 formed of the organic resin in which the titanium oxide fine particles are dispersed and lens substrates 30 and 40.

In the present invention, the optical device can also be made by a thermal polymerization method in the same manner as described above. In this case, it is desirable to keep the entire temperature of the lens and the resin composition uniform.

As described above, the obtained optical device can be used as a refractive optical device and a diffraction optical device in a projection optical system and an imaging optical system by using an optional die shape. Further, by molding the optical material into any shape or film, the optical material can be used for opto device applications, display device applications, mechanical part applications, electric/electronic part applications, and materials of various film uses typified by a hard coating, in addition to the optical applications such as lenses.

Hereinafter, Examples of the present invention are described, and the present invention is by no means limited thereto.

Examples 1 to 8 are shown below.

EXAMPLE 1

An organic solvent dispersion of preliminarily dispersed titanium oxide was obtained by sequentially adding 5.5 parts by weight of poly-2-propylene glycol as a dispersant, 30.4 parts by weight of titanium oxide fine particles each having an average primary particle diameter of 5 nm, and 10.0 parts by weight of isopropyltridodecylbenzenesulfonyl titanate as a surface treatment agent to 564.0 parts by weight of ethanol as an alcohol-based solvent, and stirring the mixture using an ultrasound mill. The resulting organic solvent dispersion of titanium oxide was in such as state that the dispersion became clouded with scattered titanium oxide fine particles although no precipitation was produced.

The organic solvent dispersion was prepared so that the contents of the solvent, the dispersant, and the surface treatment agent were 1855.6% by weight, 18.1% by weight, and 32.9% by weight, respectively with respect to the weight of the titanium oxide fine particles.

Next, 400.0 parts by weight of zirconia beads (manufactured by Neturen Co., Ltd.) having an average primary particle diameter of 15 μm was added to the organic solvent dispersion of titanium oxide prepared above. The content of the zirconia beads was 1315.1% by weight with respect to the weight of the titanium oxide fine particles. An organic solvent dispersion 101 of this example in which the titanium oxide fine particles were dispersed in an amount of 5.0% by weight was obtained by repeatedly circulating and dispersing a solution obtained by mixing the organic solvent dispersion of titanium oxide and the zirconia beads in a bead mill dispersion apparatus (manufactured by Kotobuki Industries Co., Ltd.).

EXAMPLE 2

An organic solvent dispersion 102 of this example was obtained in the same manner as in Example 1, except that the average primary particle diameter of each of the titanium oxide fine particles in Example 1 was changed to 13 nm.

EXAMPLE 3

An organic solvent dispersion 103 of this example was obtained in the same manner as in Example 1, except that the average primary particle diameter of each of the titanium oxide fine particles in Example 1 was changed to 47 nm.

EXAMPLE 4

An organic solvent dispersion 104 of this example was obtained in the same manner as in Example 2, except that the surface treatment agent in Example 2 was changed to isopropyl tris(dioctyl pyrophosphate)titanate.

EXAMPLE 5

An organic solvent dispersion 105 of this example was obtained in the same manner as in Example 2, except that the amount of the dispersant in Example 2 was changed to 8.9% by weight with respect to the weight of the titanium oxide fine particles.

EXAMPLE 6

An organic solvent dispersion 106 of this example was obtained in the same manner as in Example 2, except that the amount of the dispersant in Example 2 was changed to 50.2% by weight with respect to the weight of the titanium oxide fine particles.

EXAMPLE 7

An organic solvent dispersion 107 of this example was obtained in the same manner as in Example 2, except that the amount of the surface treatment agent in Example 2 was changed to 17.1% by weight with respect to the weight of the titanium oxide fine particles.

EXAMPLE 8

An organic solvent dispersion 108 of this example was obtained in the same manner as in Example 2, except that the amount of the surface treatment agent in Example 2 was changed to 63.1% by weight with respect to the weight of the titanium oxide fine particles.

Next, Comparative Examples 1 to 7 are shown.

Comparative Example 1

An organic solvent dispersion 201 was obtained in the same manner as in Example 2, except that the surface treatment agent in Example 2 was changed to a silane coupling agent KBM-3103 (manufactured by Shin-Etsu Chemical Co., Ltd.).

COMPARATIVE EXAMPLE 2

An organic solvent dispersion 202 was obtained in the same manner as in Example 2, except that the surface treatment agent in Example 2 was changed to a silane coupling agent KBM-503 (manufactured by Shin-Etsu Chemical Co., Ltd.).

COMPARATIVE EXAMPLE 3

An organic solvent dispersion 203 was obtained in the same manner as in Example 2, except that the surface treatment agent in Example 2 was not added.

COMPARATIVE EXAMPLE 4

An organic solvent dispersion 204 was obtained in the same manner as in Example 2, except that the dispersant in Example 2 was not added.

COMPARATIVE EXAMPLE 5

An organic solvent dispersion 205 was obtained in the same manner as in Example 2, except that the surface treatment agent in Example 2 was changed to the silane coupling agent KBM-3103 (manufactured by Shin-Etsu Chemical Co., Ltd.) and the dispersant was not added.

COMPARATIVE EXAMPLE 6

An organic solvent dispersion 206 was obtained in the same manner as in Example 2, except that the solvent in Example 2 was changed to toluene.

COMPARATIVE EXAMPLE 7

An organic solvent dispersion 207 was obtained in the same manner as in Example 2, except that the surface treatment agent in Example 2 was changed to Plenact KR TTS (carboxylic acid-based compound manufactured by Ajinomoto Fine-Techno Co., Inc.).

Tables 1 and 2 show the results of dispersed states of the fine particles in the organic solvent dispersions of titanium oxide obtained in Examples 1 to 8 and Comparative Examples 1 to 7.

In the tables, the presence or absence of clouding and the presence or absence of gelation were evaluated.

(Evaluation of Presence or Absence of Clouding)

The obtained organic solvent dispersions of titanium oxide were each placed in a quartz cell having a thickness of 2 mm, irradiated with light having a wavelength of 430 nm, and a scattering rate was measured. Based on the results, those having a scattering rate of 0.01% or more to less than 1.0% were evaluated as "OK" and those having a scattering rate of 1.0% or more were evaluated as "NG".

(Evaluation of Presence or Absence of Gelation)

During the dispersion treatment or for 3 months after the dispersion treatment, those which did not gelate were evaluated as "OK" and those which gelated were evaluated as "NG".

TABLE 1

| | Organic solvent dispersion | Solvent | Dispersant | Parts by weight of dispersant with respect to 100 parts by weight of fine particles | Surface treatment agent | Parts by weight of surface treatment agent with respect to 100 parts by weight of fine particles | Fine particle size (nm) | Dispersed state | |
|---|---|---|---|---|---|---|---|---|---|
| | | | | | | | | Clouding | Gelation |
| Example 1 | Organic solvent dispersion 101 | Ethanol | Poly-2-propylene glycol | 18.1 | Isopropyltridodecyl-benzenesulfonyl titanate | 32.9 | 5 | OK | OK |
| Example 2 | Organic solvent dispersion 102 | Ethanol | Poly-2-propylene glycol | 18.1 | Isopropyltridodecyl-benzenesulfonyl titanate | 32.9 | 13 | OK | OK |
| Example 3 | Organic solvent dispersion 103 | Ethanol | Poly-2-propylene glycol | 18.1 | Isopropyltridodecyl-benzenesulfonyl titanate | 32.9 | 47 | OK | OK |
| Example 4 | Organic solvent dispersion 104 | Ethanol | Poly-2-propylene glycol | 18.1 | isopropyl tris(dioctyl pyrophosphate) titanate | 32.9 | 13 | OK | OK |
| Example 5 | Organic solvent dispersion 105 | Ethanol | Poly-2-propylene glycol | 8.9 | Isopropyltridodecyl-benzenesulfonyl titanate | 32.9 | 13 | OK | OK |
| Example 6 | Organic solvent dispersion 106 | Ethanol | Poly-2-propylene glycol | 50.2 | Isopropyltridodecyl-benzenesulfonyl titanate | 32.9 | 13 | OK | OK |
| Example 7 | Organic solvent dispersion 107 | Ethanol | Poly-2-propylene glycol | 18.1 | Isopropyltridodecyl-benzenesulfonyl titanate | 17.1 | 13 | OK | OK |
| Example 8 | Organic solvent dispersion 108 | Ethanol | Poly-2-propylene glycol | 18.1 | Isopropyltridodecyl-benzenesulfonyl titanate | 63.1 | 13 | OK | OK |

TABLE 2

| | Organic solvent dispersion | Solvent | Dispersant | Parts by weight of dispersant with respect to 100 parts by weight of fine particles | Surface treatment agent | Parts by weight of surface treatment agent with respect to 100 parts by weight of fine particles | Fine particle size (nm) | Dispersed state Clouding | Gelation |
|---|---|---|---|---|---|---|---|---|---|
| Comparative Example 1 | Organic solvent dispersion 201 | Ethanol | Poly-2-propylene glycol | 18.1 | Silane coupling agent: KBM-3103 | 32.9 | 13 | NG | NG |
| Comparative Example 2 | Organic solvent dispersion 202 | Ethanol | Poly-2-propylene glycol | 18.1 | Silane coupling agent: KBM-503 | 32.9 | 13 | NG | NG |
| Comparative Example 3 | Organic solvent dispersion 203 | Ethanol | Poly-2-propylene glycol | 18.1 | — | 0 | 13 | NG | NG |
| Comparative Example 4 | Organic solvent dispersion 204 | Ethanol | — | 0 | Isopropyltridodecyl-benzenesulfonyl titanate | 32.9 | 13 | NG | OK |
| Comparative Example 5 | Organic solvent dispersion 205 | Ethanol | — | 0 | Silane coupling agent: KBM-3103 | 32.9 | 13 | NG | OK |
| Comparative Example 6 | Organic solvent dispersion 206 | Toluene | Poly-2-propylene glycol | 18.1 | Isopropyltridodecyl-benzenesulfonyl titanate | 32.9 | 13 | NG | NG |
| Comparative Example 7 | Organic solvent dispersion 207 | Ethanol | Poly-2-propylene glycol | 18.1 | KR TTS | 32.9 | 13 | NG | NG |

The organic solvent dispersions 101 to 108 according to the present invention obtained in Examples 1 to 8 produced extremely low levels of scatter, and exhibited a stable fine particle-dispersed state without gelating. The organic solvent dispersions of titanium oxide 204 and 205 obtained in Comparative Examples 4 and 5 each had a scattering rate of 1.0% or more although the dispersions did not gelate, and some clouding was observed therein. Each of the organic solvent dispersions of titanium oxide obtained in other comparative examples scarcely transmitted light, obviously became clouded, or produced clouding by gelating.

Next, resin compositions were produced using the organic solvent dispersions 101 to 108 of titanium oxide of Examples 1 to 8 and the organic solvent dispersions 204 and 205 of titanium oxide of Comparative Examples 4 and 5, which did not gelate, out of the organic solvent dispersions obtained in Examples 1 to 8 and Comparative Examples 1 to 7.

Examples 9 to 18 are shown below.

EXAMPLE 9

An uncured resin composition 301 was obtained by adding 78.1 parts by weight of an organic resin (KAYARADOR-604 manufactured by Nippon Kayaku Co., Ltd.) and 2.4 parts by weight of a photopolymerization initiator (Irgacure 184 manufactured by Ciba Specialty Chemicals Corporation) to 100 parts by weight of the organic solvent dispersion 101 of titanium oxide obtained in Example 1, compatibilizing the contents, and removing the solvent from the resulting solution under reduced pressure.

The resin composition was prepared so that the content of titanium oxide fine particles was 6.4% by weight with respect to the organic resin and the content of the photopolymerization initiator was 3.0% by weight with respect to the organic resin.

EXAMPLE 10

An uncured resin composition 302 was obtained in the same manner as in Example 9, except that the organic solvent dispersion 102 was used in place of the organic solvent dispersion 101 in Example 9.

EXAMPLE 11

An uncured resin composition 303 was obtained in the same manner as in Example 9, except that the organic solvent dispersion 103 was used in place of the organic solvent dispersion 101 in Example 9.

EXAMPLE 12

An uncured resin composition 304 was obtained in the same manner as in Example 9, except that the organic solvent dispersion 104 was used in place of the organic solvent dispersion 101 in Example 9.

EXAMPLE 13

An uncured resin composition 305 was obtained in the same manner as in Example 10, except preparing the uncured resin composition so that the content of the titanium oxide fine particles in Example 10 was 22.0% by weight with respect to the organic resin.

EXAMPLE 14

An uncured resin composition 306 was obtained in the same manner as in Example 10, except preparing the uncured resin composition so that the content of the titanium oxide fine particles in Example 10 was 47.1% by weight with respect to the organic resin.

EXAMPLE 15

A resin composition was prepared by the same technique using the organic solvent dispersion 105 in place of the organic solvent dispersion 101 in Example 9 so that the content of the titanium oxide fine particles was 6.4% by weight with respect to the organic resin. The uncured resin composition 307 was obtained in such way.

EXAMPLE 16

A resin composition was prepared by the same technique using the organic solvent dispersion 106 in place of the organic solvent dispersion 101 in Example 9 so that the content of the titanium oxide fine particles was 6.4% by weight with respect to the organic resin. The uncured resin composition 308 was obtained in such way.

EXAMPLE 17

A resin composition was prepared by the same technique using the organic solvent dispersion 107 in place of the organic solvent dispersion 101 in Example 9 so that the content of the titanium oxide fine particles was 6.4% by weight with respect to the organic resin. The uncured resin composition 309 was obtained in such way.

EXAMPLE 18

A resin composition was prepared by the same technique using the organic solvent dispersion 108 in place of the organic solvent dispersion 101 in Example 9 so that the content of the titanium oxide fine particles was 6.4% by weight with respect to the organic resin. The uncured resin compo sition 310 was obtained in such way.

Comparative Examples 8 and 9 are shown below.

COMPARATIVE EXAMPLE 8

An uncured resin composition 401 was obtained in the same manner as in Example 9, except that the organic solvent dispersion 204 was used in place of the organic solvent dispersion 101 in Example 9.

A resin composition was prepared by the same technique using the organic solvent dispersion 204 in place of the organic solvent dispersion 101 in Example 9 so that the content of the titanium oxide fine particles was 6.4% by weight with respect to the organic resin. The uncured resin composition 401 was obtained in such way.

COMPARATIVE EXAMPLE 9

An uncured resin composition 402 was obtained in the same manner as in Example 9, except that the organic solvent dispersion 205 was used in place of the organic solvent dispersion 101 in Example 9.

A resin composition was prepared by the same technique using the organic solvent dispersion 205 in place of the organic solvent dispersion 101 in Example 9 so that the content of the titanium oxide fine particles was 6.4% by weight with respect to the organic resin. The uncured resin composition 402 was obtained in such way.

Each optical material obtained in Examples 9 to 18 and Comparative Examples 11 and 12 was poured in a molding die formed of two glass plates through a 0.5 mm spacer, and irradiated with ultraviolet light at an irradiation intensity of 20 mW/cm$^2$ from above and below the die for 300 seconds to cure the resin composition. A resin composition was obtained by heating in air at 60° C. for 15 hours after releasing the glass plates.

The results of the dispersed states of the fine particles in the resin compositions derived from Examples 9 to 18 and Comparative Examples 8 and 9 are shown in Tables 3 and 4.

In the tables, the presence or absence of clouding and the presence or absence of gelation are evaluated as "OK" or "NG".

(Evaluation of Presence or Absence of Clouding)

As a result of measuring the scattering rate of light with a wavelength of 430 nm in the resin composition, those having the scattering rate of 0.1% or more to less than 3.5% were evaluated as "OK", and those having the scattering rate of 3.5% or more were evaluated as "NG".

(Evaluation of Presence or Absence of Gelation)

After removing a solvent under reduced pressure from the organic solvent dispersion, those which did not gelate were evaluated as "OK", and those which gelated were evaluated as "NG".

TABLE 3

| | Organic solvent dispersion | Resin composition | Concentration of fine particles in resin (% by weight) | Dispersed state | |
|---|---|---|---|---|---|
| | | | | Clouding | Gelation |
| Example 9 | Organic solvent dispersion 101 | Resin composition 301 | 6 | OK | OK |
| Example 10 | Organic solvent dispersion 102 | Resin composition 302 | 6 | OK | OK |
| Example 11 | Organic solvent dispersion 103 | Resin composition 303 | 6 | OK | OK |
| Example 12 | Organic solvent dispersion 104 | Resin composition 304 | 6 | OK | OK |
| Example 13 | Organic solvent dispersion 102 | Resin composition 305 | 18 | OK | OK |
| Example 14 | Organic solvent dispersion 102 | Resin composition 306 | 32 | OK | OK |
| Example 15 | Organic solvent dispersion 105 | Resin composition 307 | 6 | OK | OK |
| Example 16 | Organic solvent dispersion 106 | Resin composition 308 | 6 | OK | OK |
| Example 17 | Organic solvent dispersion 107 | Resin composition 309 | 6 | OK | OK |
| Example 18 | Organic solvent dispersion 108 | Resin composition 310 | 6 | OK | OK |

TABLE 4

| | Organic solvent dispersion | Resin composition | Concentration of fine particles in resin (% by weight) | Dispersed state Clouding | Gelation |
|---|---|---|---|---|---|
| Comparative Example 8 | Organic solvent dispersion 204 | Resin composition 401 | 6 | NG | NG |
| Comparative Example 9 | Organic solvent dispersion 205 | Resin composition 402 | 6 | NG | NG |

The uncured resin compositions 301 to 310 according to the present invention obtained in Examples 9 to 18 produced extremely low levels of scatter and exhibited stable fine particle-dispersed states without gelating. Likewise, the resin compositions also produced extremely low levels of scatter.

The uncured resin compositions 401 and 402 obtained in Comparative Examples 8 and 9 gelated during or after removing the solvent under reduced pressure.

(Formation of Optical Device)

An optical device sandwiched with two glass lenses was made using the uncured resin composition optical material 306 obtained in Example 14 by the method utilizing the photopolymerization mechanism described above. The resultant optical device produced extremely low level of scatter, and was good.

This confirmed that the organic solvent dispersion of titanium oxide according to the present invention produced extremely low level of scatter. It was also confirmed that the resin composition produced using the organic solvent dispersion of titanium oxide likewise produced extremely low level of scatter. Further, the optical device produced using the resin composition produced low level of scatter, and was good.

This application claims the benefit of Japanese Patent Application No. 2009-284553, filed Dec. 15, 2009, which is hereby incorporated by reference herein in its entirety.

The invention claimed is:

1. An organic solvent dispersion comprising:
    titanium oxide fine particles each having an average primary particle diameter of 3 nm or more to 50 nm or less, wherein content of the titanium oxide fine articles contained in the organic solvent dispersion is 0.1% by weight or more to 30.0% by weight or less;
    a titanate-based surface treatment agent formed of a compound represented by the following general formula (1):

$$(R_1O)_m\text{—Ti—}X_n \quad (1)$$

where $R_1$ represents a methyl, ethyl, or isopropyl group; X represents —O—SO$_2$—R$_2$ or —O—P(OH)O—O—PHO—O—R$_2$; R$_2$ represents an alkyl or aryl group having 1 to 16 carbon atoms; m represents a numerical value of 1 or more to 3 or less, and n represents a numerical value of 1 or more to 3 or less, provided that m+n=4, wherein content of the titanate-based surface treatment agent is 10.0% by weight or more to 75.0% by weight or less with respect to weight of the titanium oxide fine particles;
    a polyether-based dispersant, wherein content of the polyether-based dispersant is 3.0% by weight or more to 60.0% by weight or less with respect to weight of the titanium oxide fine particles; and
    an alcohol-based solvent, wherein content of the alcohol-based solvent is 180% by weight or more to 100,000% by weight or less with respect to weight of the titanium oxide fine particles.

2. A resin composition comprising:
    an organic resin;
    titanium oxide fine particles each having an average primary particle diameter of 3 nm or more to 50 nm or less;
    a titanate-based surface treatment agent formed of a compound represented by the following general formula (1):

$$(R_1O)_m\text{—Ti—}X_n \quad (1)$$

where $R_1$ represents a methyl, ethyl, or isopropyl group; X represents —O—SO$_2$—R$_2$ or —O—P(OH)O—O—PHO—O—R$_2$; R$_2$ represents an alkyl or aryl group having 1 to 16 carbon atoms; m represents a numerical value of 1 or more to 3 or less, n represents a numerical value of 1 or more to 3 or less, provided that m+n=4, wherein content of the titanate-based surface treatment agent is 10.0% by weight or more to 75.0% by weight or less with respect to weight of the titanium oxide fine particles; and
    a polyether-based dispersant, wherein content of the polyether-based dispersant is 3.0% by weight or more to 60.0% by weight or less with respect to weight of the titanium oxide fine particles.

3. An optical device comprising an optical member formed of the resin composition according to claim 2, the optical member being formed on a surface of a substrate.

4. An optical device comprising an optical member formed of the resin composition according to claim 2, the optical member being formed between two substrates.

5. The organic solvent dispersion according claim 1, wherein the organic solvent dispersion is processed by a bead mill dispersion treatment apparatus.

6. The organic solvent dispersion according to claim 1, wherein the polyether-based dispersant comprises polypropylene glycol or poly-2-propylene glycol.

7. The organic solvent dispersion according to claim 1, wherein the polyether-based dispersant comprises poly-2-propylene glycol, and the titanate-based surface treatment agent comprises isopropyl tridodecylsulfonyl titanate.

8. A resin composition produced by a method of producing a resin composition, the method comprising:
    after mixing a polymerizable monomer and the organic solvent dispersion according to claim 1, polymerizing the polymerizable monomer; and
    after the polymerization, removing the alcohol-based solvent.

9. The optical device according to claim 3, wherein the substrate is glass and the optical device is a lens.

10. The optical device according to claim 4, wherein the two substrates are glass and the optical device is a lens.

* * * * *